US012693141B2

(12) United States Patent
Yoda et al.

(10) Patent No.: US 12,693,141 B2
(45) Date of Patent: Jul. 28, 2026

(54) OPTICAL FIBER SENSING SYSTEM, HOST SENSING DEVICE, REMOTE SENSING DEVICE, SENSING METHOD, AND SENSING DEVICE CONTROL METHOD

(71) Applicant: NEC Corporation, Tokyo (JP)

(72) Inventors: Yukihide Yoda, Tokyo (JP); Koyo Mori, Tokyo (JP); Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 18/270,669

(22) PCT Filed: Jan. 6, 2021

(86) PCT No.: PCT/JP2021/000149
§ 371 (c)(1),
(2) Date: Jun. 30, 2023

(87) PCT Pub. No.: WO2022/149199
PCT Pub. Date: Jul. 14, 2022

(65) Prior Publication Data
US 2024/0060802 A1 Feb. 22, 2024

(51) Int. Cl.
*G01D 5/353* (2006.01)
*G01M 11/00* (2006.01)

(52) U.S. Cl.
CPC ..... *G01D 5/35358* (2013.01); *G01D 5/35354* (2013.01); *G01D 5/35383* (2013.01); *G01M 11/3154* (2013.01)

(58) Field of Classification Search
CPC ........... G01D 5/35354; G01D 5/35358; G01D 5/35361; G01D 5/35364; G01D 5/35367;
(Continued)

(56) References Cited

U.S. PATENT DOCUMENTS 6,211,964 B1 * 4/2001 Luscombe ............. G01H 9/004
250/227.27
11,898,900 B1 * 2/2024 Campos ............. G01D 5/35358
(Continued)

FOREIGN PATENT DOCUMENTS

EP 3361225 A1 * 8/2018
JP H06-186091 A 7/1994
(Continued)

OTHER PUBLICATIONS

International Search Report for PCT Application No. PCT/JP2021/000149, mailed on Mar. 2, 2021.
(Continued)

*Primary Examiner* — Michael Stahl
(74) *Attorney, Agent, or Firm* — Sughrue Mion, PLLC

(57) ABSTRACT

The optical fiber sensing system includes: a host sensing device including a first optical sensor for receiving, from a first optical fiber, first light corresponding to first pulse light input into the first optical fiber and first signal light and outputting first data for the first optical fiber corresponding to the first light and second data included in the first signal light, and a first data communicator for outputting a data signal including the first data and second data; and a remote sensing device including a second optical sensor for receiving, from a second optical fiber, second light that corresponds to second pulse light input into the second optical fiber and outputting second data including sensing results for the second optical fiber corresponding to the second light, and a second data communicator for outputting, to the first optical fiber, first signal light including the second data.

14 Claims, 9 Drawing Sheets

OPTICAL FIBER SENSING SYSTEM 1

(58) Field of Classification Search
CPC ........... G01D 5/35383; G01D 5/35387; G01D
5/3539; G01D 5/35393; G01D 5/3596;
H04B 10/071; H04B 10/075; H04B
10/077; H04B 10/0771; H04B 10/0773;
G01M 11/3154
See application file for complete search history.

(56) References Cited

U.S. PATENT DOCUMENTS

| | | | | | |
|---|---|---|---|---|---|
| 2004/0047629 | A1* | 3/2004 | Evangelides, Jr. | .. | H04B 10/071 |
| | | | | | 398/33 |
| 2007/0258330 | A1* | 11/2007 | Berg | ........................ | G01V 1/16 |
| | | | | | 367/149 |
| 2008/0101157 | A1* | 5/2008 | Ronnekleiv | .............. | G01V 1/20 |
| | | | | | 367/64 |
| 2019/0006157 | A1* | 1/2019 | O'Banion | ......... | H01L 21/67109 |

| | | | | |
|---|---|---|---|---|
| 2020/0200592 | A1* | 6/2020 | Huang | ................. H04B 10/071 |
| 2020/0209417 | A1 | 7/2020 | Englund | |
| 2020/0313763 | A1* | 10/2020 | Wang | ............... H04B 10/25753 |
| 2022/0044552 | A1 | 2/2022 | Yoda et al. | |

FOREIGN PATENT DOCUMENTS

| | | |
|---|---|---|
| JP | H11-283136 A | 10/1999 |
| JP | 2002-048517 A | 2/2002 |
| JP | 2004-109004 A | 4/2004 |
| JP | 2020-527236 A | 9/2020 |
| WO | 2020/116032 A1 | 6/2020 |

OTHER PUBLICATIONS

English translation of Written opinion for PCT Application No. PCT/JP2021/000149, mailed on Mar. 2, 2021.

* cited by examiner

Fig.1

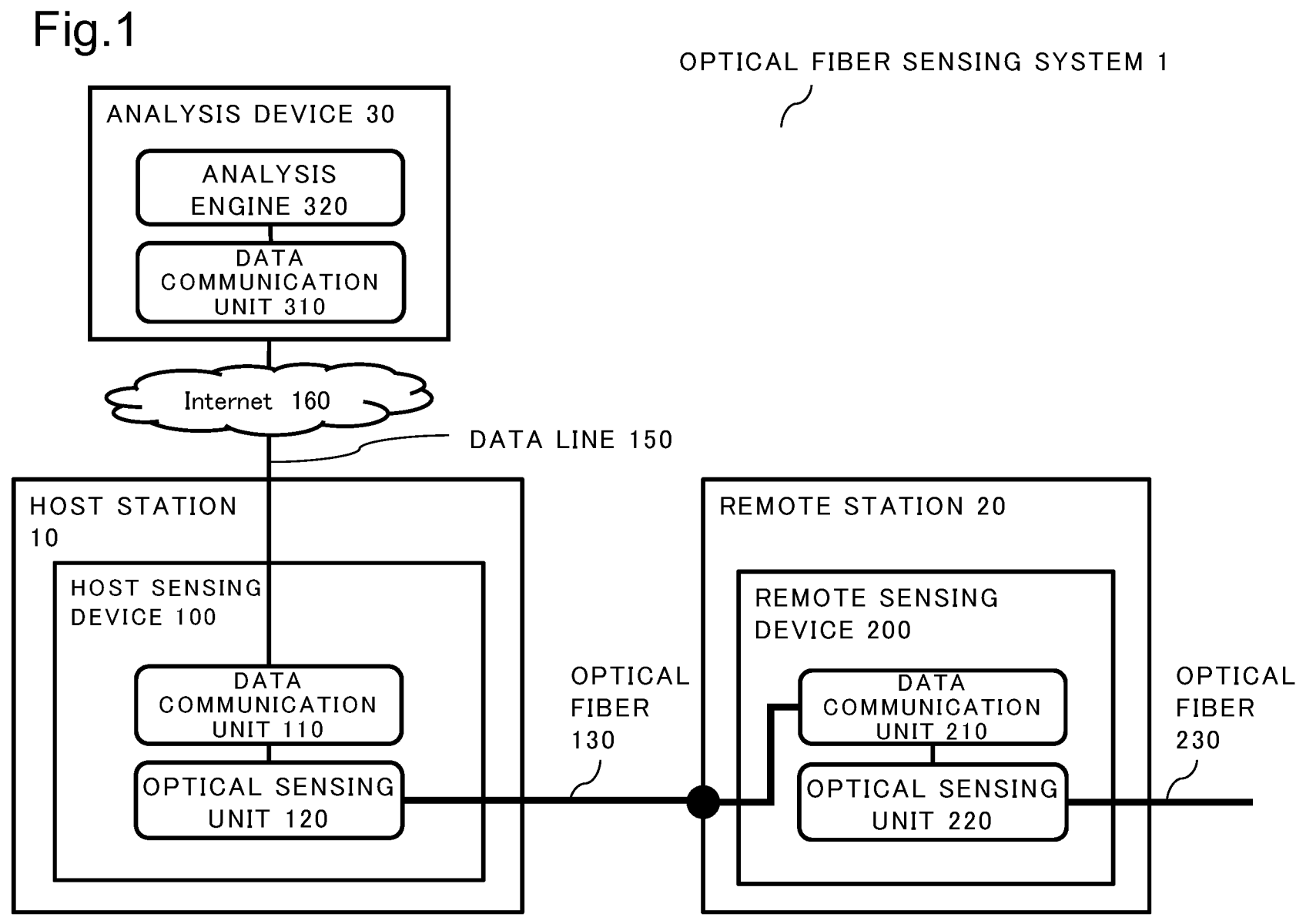

OPTICAL FIBER SENSING SYSTEM 1

ANALYSIS DEVICE 30

ANALYSIS ENGINE 320

DATA COMMUNICATION UNIT 310

Internet 160

DATA LINE 150

HOST STATION 10

HOST SENSING DEVICE 100

DATA COMMUNICATION UNIT 110

OPTICAL SENSING UNIT 120

OPTICAL FIBER 130

REMOTE STATION 20

REMOTE SENSING DEVICE 200

DATA COMMUNICATION UNIT 210

OPTICAL SENSING UNIT 220

OPTICAL FIBER 230

Fig.3

OPTICAL FIBER SENSING SYSTEM, HOST SENSING DEVICE, REMOTE SENSING DEVICE, SENSING METHOD, AND SENSING DEVICE CONTROL METHOD

This application is a National Stage Entry of PCT/JP2021/000149 filed on Jan. 6, 2021, the contents of all of which are incorporated herein by reference, in their entirety.

TECHNICAL FIELD

The present invention relates to an optical fiber sensing system. The present invention particularly relates to a remote sensing device, a host sensing device, an optical fiber sensing system, a sensing method, and a method for controlling a sensing device that perform sensing by using an optical fiber.

BACKGROUND ART

When pulse light is input to an optical fiber, the pulse light generates backscattered light. The backscattered light is light propagating in an opposite direction to the pulse light. A physical process of generating the backscattered light includes, for example, Rayleigh scattering, Brillouin scattering, and Raman scattering. The backscattered light has a physical characteristic (for example, intensity of the backscattered light and a wavelength shift amount from the pulse light) changing according to a temperature of an optical fiber at a scattered place, vibration and pressure applied to an optical fiber at a scattered place, and the like. For example, a fluctuation in pressure and sound applied to an optical fiber can be detected from Rayleigh scattered light. Further, it is known that a fluctuation in pressure applied to an optical fiber can be detected from Brillouin scattered light, and a temperature change of an optical fiber can be detected from Raman scattered light. Therefore, by intermittently causing single pulse light to be incident on an optical fiber, and analyzing data about a change amount of a characteristic of backscattered light and a reception time of the backscattered light, pressure, vibration, and time change of the pressure and the vibration in any position in a longitudinal direction of the optical fiber can be acquired.

FIG. 9 is a diagram illustrating a configuration example of a general optical fiber sensing system 9. A sensing device 901 installed in a host station 91 transmits pulse light from an optical sensing unit 905 to an optical fiber 93 constructed between the host station 91 and a remote station 92, and thus performs sensing on an environment in which the optical fiber 93 is constructed. Further, a sensing device 902 installed in the remote station 92 transmits pulse light from an optical sensing unit 906 to an optical fiber 94 different from the optical fiber 93, and thus performs sensing on an environment in which the optical fiber 94 is constructed. Since the principle of sensing by transmitting pulse light to an optical fiber is well known, detailed description is omitted.

The sensing device 902 outputs data including a sensing result of the optical fiber 94 from a data communication unit 904 to a data line 96. A data communication unit 903 receives a sensing result of the sensing device 902 via the data line 96, also receives a sensing result of the optical fiber 93 from the optical sensing unit 905, and outputs the sensing results to a data line 95.

An analysis device 98 receives data including the sensing results being output from the host station 91 via the data line 95 and Internet 97. Then, the analysis device 98 calculates a change (for example, a time change in distribution of vibration and temperature) in each of the environments in which the optical fibers 93 and 94 are constructed, based on each of the received sensing results.

In relation to the present invention, PTL 1 discloses a system that monitors a road by detecting backscattered light.

CITATION LIST

Patent Literature

PTL 1: International Patent Publication No. WO2020/116032

SUMMARY OF INVENTION

Technical Problem

Since the analysis device 98 can be put together in one place in the optical fiber sensing system 9 described in FIG. 9, the host station 91 and the remote station 92 do not need a function of an analysis device. However, the remote station 92 does not have a line that can directly perform communication between the analysis device 98 and the remote station 92. Thus, the data line 96 is installed between the host station 91 that can communicate with the analysis device 98 and the remote station 92, and sensing data are transferred to the analysis device 98 via the data lines 96 and 95 and the Internet 97. In other words, a data line is needed between the host station 91 and the remote station 92 in the optical fiber sensing system 9, and a configuration of the optical fiber sensing system 9 is not simple.

OBJECT OF INVENTION

An object of the present invention is to provide a technique for easily constructing an optical fiber sensing system.

Solution to Problem

An optical fiber sensing system according to the present invention includes:

a host sensing device including a first optical sensing means for receiving, from a first optical fiber, first light in response to first pulse light being input to the first optical fiber, and first signal light, and outputting first sensing data about the first optical fiber in response to the first light and second sensing data included in the first signal light, and a first data communication means for outputting a data signal including the first sensing data and the second sensing data; and a remote sensing device including a second optical sensing means for receiving, from a second optical fiber, second light in response to second pulse light being input to the second optical fiber, and outputting the second sensing data including a sensing result of the second optical fiber in response to the second light, and a second data communication means for outputting the first signal light including the second sensing data to the first optical fiber.

Further, a host sensing device according to the present invention includes:

a first optical sensing means for receiving, from a first optical fiber, first light in response to first pulse light being input to the first optical fiber, and first signal light, and outputting first sensing data about the first optical fiber in response to the first light and second sensing data included in the first signal light; and a first data communication means for outputting a data signal including the first sensing data and the second sensing data.

Further, a remote sensing device according to the present invention includes:

a second optical sensing means for receiving, from a second optical fiber, second light in response to second pulse light being input to the second optical fiber, and outputting second sensing data including a sensing result of the second optical fiber in response to the second light; and a second data communication means for outputting first signal light including the second sensing data to a first optical fiber.

Further, a sensing method according to the present invention includes:

a procedure of receiving, from a first optical fiber, first light in response to first pulse light being input to the first optical fiber, and first signal light, and outputting first sensing data about the first optical fiber in response to the first light and second sensing data included in the first signal light;

a procedure of outputting a data signal including the first sensing data and the second sensing data;

a procedure of receiving, from a second optical fiber, second light in response to second pulse light being input to the second optical fiber, and outputting the second sensing data including a sensing result of the second optical fiber in response to the second light; and a procedure of outputting the first signal light including the second sensing data to the first optical fiber.

Further, a method for controlling a sensing device, according to the present invention includes:

a procedure of receiving, from a first optical fiber, first light in response to first pulse light being input to the first optical fiber, and first signal light, and outputting first sensing data about the first optical fiber in response to the first light and second sensing data included in the first signal light; and a procedure of outputting a data signal including the first sensing data and the second sensing data.

Further, a method for controlling a sensing device, according to the present invention includes:

a procedure of receiving, from a second optical fiber, second light in response to second pulse light being input to the second optical fiber, and outputting second sensing data including a sensing result of the second optical fiber in response to the second light; and a procedure of outputting first signal light including the second sensing data to a first optical fiber.

Advantageous Effects of Invention

The present invention is able to easily construct an optical fiber sensing system.

BRIEF DESCRIPTION OF DRAWINGS

FIG. 1 is a block diagram illustrating a configuration example of a sensing system 1 according to a first example embodiment.

FIG. 3 is a block diagram illustrating a configuration example of a host sensing device 100.

EXAMPLE EMBODIMENT

Figure 2:
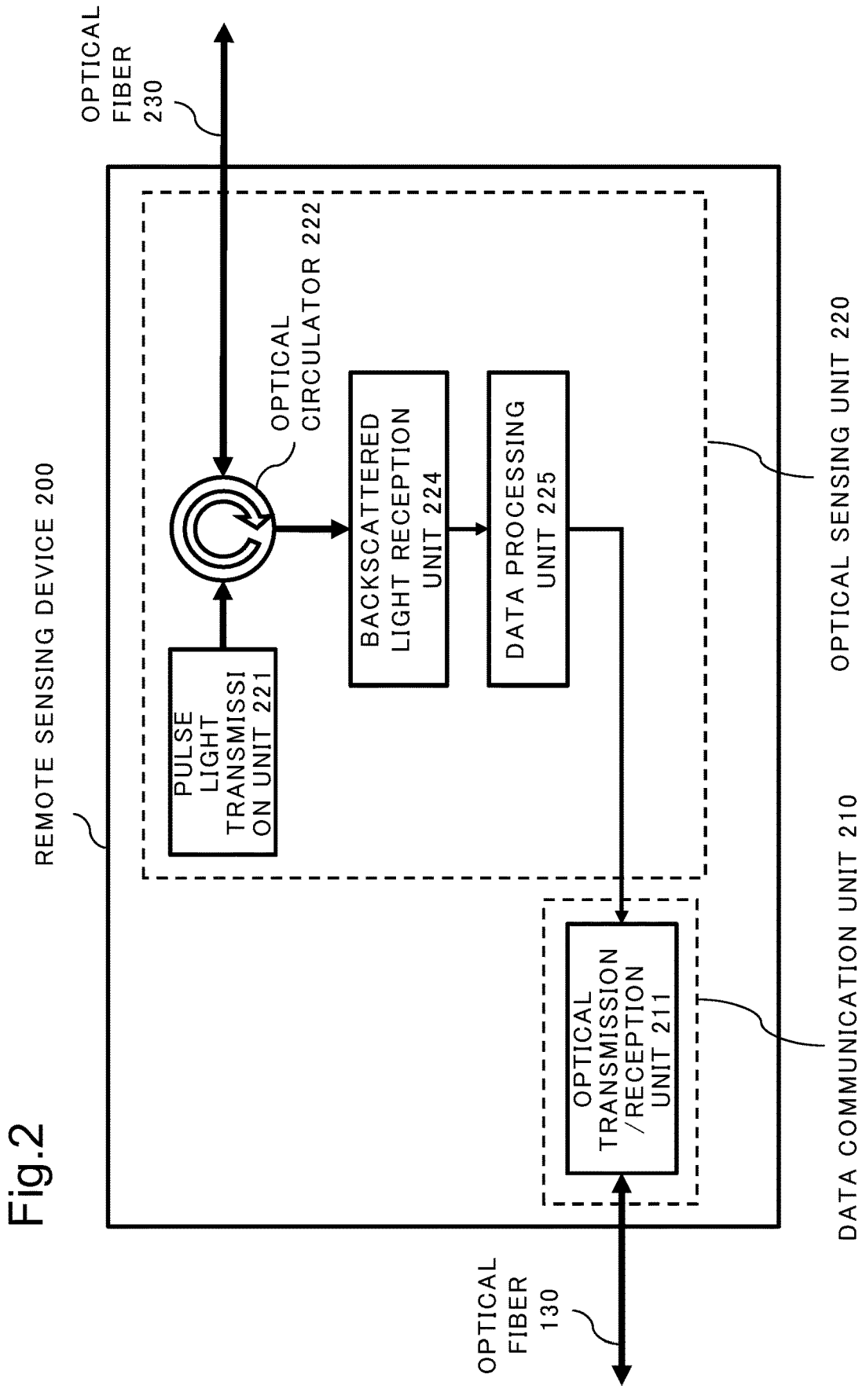
FIG. 2 is a block diagram illustrating a configuration example of a remote sensing device 200.

Hereinafter, example embodiments of the present invention will be described with reference to drawings. An arrow illustrated in the drawings indicates a direction of a signal or an order of processing, and does not intend to impose limitations. Further, a component that has already been described is provided with the same reference sign in the example embodiments and the drawings, and redundant description thereof will be omitted.

First Example Embodiment

FIG. 1 is a block diagram illustrating a configuration example of an optical fiber sensing system 1 according to a first example embodiment of the present invention. The optical fiber sensing system 1 includes a host station 10, a remote station 20, and an analysis device 30. The host station 10 includes a host sensing device 100, and the remote station 20 includes a remote sensing device 200.

The host sensing device 100 transmits pulse light to an optical fiber 130 constructed between the remote station 20 and the host sensing device 100, detects backscattered light of the pulse light, and performs sensing on an environment around the optical fiber 130. For example, an optical sensing unit 120 detects a reception time, intensity, and a wavelength of the backscattered light of the optical fiber 130, and outputs data (hereinafter referred to as "sensing data") including data indicating the detection result and a transmission time of the pulse light to a data communication unit 110. Furthermore, the optical sensing unit 120 receives, from the optical fiber 130, data signal light including sensing data about an optical fiber 230 being output from the remote station 20, extracts the sensing data about the optical fiber 230 from the data signal light, and outputs the sensing data to the data communication unit 110. The optical fiber 130 is connected to a data communication unit 210 in the remote station 20. However, a sensing range of the optical fiber 130 by the host sensing device 100 does not need to extend to a connection point between the optical fiber 130 and the data communication unit 210. For example, the sensing range by the host sensing device 100 may extend to a boundary point of the optical fiber 130 with the inside of the remote station 20. The boundary point is indicated by a black dot on the optical fiber 130 in FIG. 1.

The data communication unit 110 is an interface with a data line 150. The data communication unit 110 acquires the sensing data about the optical fiber 130 and the sensing data about the optical fiber 230 from the optical sensing unit 120. Then, the data communication unit 110 transfers the sensing data about the optical fibers 130 and 230 to the analysis device 30 via the data line 150 and Internet 160. The sensing data may be transferred by a special line that connects the host station 10 and the analysis device 30.

The remote sensing device 200 transmits pulse light to the optical fiber 230 different from the optical fiber 130, and acquires the sensing data about the optical fiber 230 by detecting backscattered light of the pulse light. For example, an optical sensing unit 220 detects a reception time, intensity, and a wavelength of the backscattered light of the optical fiber 230, and outputs, as the sensing data about the optical fiber 230, data indicating the detection result and a transmission time of the pulse light to the data communication unit 210. The data communication unit 210 transmits, as data signal light, light modulated by the sensing data about the optical fiber 230 to the optical fiber 130.

The analysis device 30 further includes a data communication unit 310 and an analysis engine 320. The data communication unit 310 receives the sensing data about the optical fiber 130 and the sensing data about the optical fiber 230 from the data communication unit 110, and outputs the sensing data to the analysis engine 320. The analysis engine 320 obtains, based on the sensing data, a physical quantity such as vibration and pressure applied to the optical fibers 130 and 230 and a temperature of the optical fibers 130 and 230 in association with a position in a longitudinal direction of each of the optical fibers. Since a procedure of obtaining the physical quantity from the sensing data is known, detailed description will be omitted. The analysis device 30 can estimate a phenomenon occurring around the optical fibers 130 and 230 by accumulating and analyzing the obtained physical quantity. For example, the analysis device 30 estimates a phenomenon in a region in which the optical fibers 130 and 230 are constructed, based on a fluctuation in one or more physical quantities. When an analysis result that a temperature rises in a specific position of the optical fiber 130 or 230 is acquired, the analysis device 30 may decide that there is a possibility that a fire breaks out near the position. When an analysis result that vibration and pressure increase in a specific position of the optical fiber 130 or 230 is acquired, the analysis device 30 may decide that there is a possibility that entry of a falling rock or a moving body, and the like occur in the position. An estimation example of a phenomenon by a physical quantity obtained in the analysis device 30 is not limited to the example above. The analysis device 30 accumulates an analysis result, and outputs the analysis result in any form such as data and a screen display in response to a request from a user of the optical fiber sensing system 1.

FIG. 2 is a block diagram illustrating a configuration example of the remote sensing device 200 included in the remote station 20. The remote sensing device 200 includes the data communication unit 210 and the optical sensing unit 220 as functional blocks. The data communication unit 210 includes an optical transmission/reception unit 211. The optical sensing unit 220 includes a pulse light transmission unit 221, an optical circulator 222, a backscattered light reception unit 224, and a data processing unit 225.

The remote sensing device 200 transmits pulse light to the optical fiber 230, detects backscattered light generated inside the optical fiber 230, and thus performs sensing on a physical quantity in a position in the longitudinal direction of the optical fiber 230. The pulse light transmission unit 221 intermittently generates pulse light. The pulse light is transmitted to the optical fiber 230 through the optical circulator 222. Backscattered light generated in response to the pulse light is received by the backscattered light reception unit 224 through the optical circulator 222.

The backscattered light reception unit 224 converts the backscattered light of the optical fiber 230 into an electric signal including information about a physical quantity to be a target of sensing. A kind of the backscattered light converted into the electric signal is selected according to a kind of the physical quantity (such as temperature, pressure, and vibration) to be the target of sensing. For example, when a time change in pressure in a direction along the optical fiber 230 is measured, the backscattered light reception unit 224 converts Brillouin scattered light of pulse light into an electric signal, and outputs the electric signal to the data processing unit 225. In order to convert backscattered light of a specific wavelength into an electric signal, the backscattered light reception unit 224 includes, for example, an optical band pass filter and a photoelectric conversion element. When a plurality of physical quantities are measured, a plurality of optical band pass filters associated with a wavelength of backscattered light that can detect each of the physical quantities may be used. The backscattered light of the optical fiber 230 is converted into an electric signal for each detected wavelength range and output to the data processing unit 225.

The data processing unit 225 converts, into a digital signal, the backscattered light converted into the electric signal, and outputs the digital signal as sensing data about the optical fiber 230 to the optical transmission/reception unit 211. The sensing data include data about a physical quantity needed for analyzing a sensing result of the optical fiber 230 in the analysis device 30.

The optical transmission/reception unit 211 converts the sensing data being input from the data processing unit 225 into signal light (hereinafter referred to as "data signal light"), and outputs the signal light to the optical fiber 130. Further, when the optical transmission/reception unit 211 receives, from the optical fiber 130, signal light transmitted from the host station 10, the optical transmission/reception unit 211 may convert the signal light into an electric signal, and output the signal light to the data processing unit 225. The signal light received from the host station 10 includes, for example, data for controlling the remote sensing device 200. The data processing unit 225 may control the remote sensing device 200 in response to the data.

Figure 3:
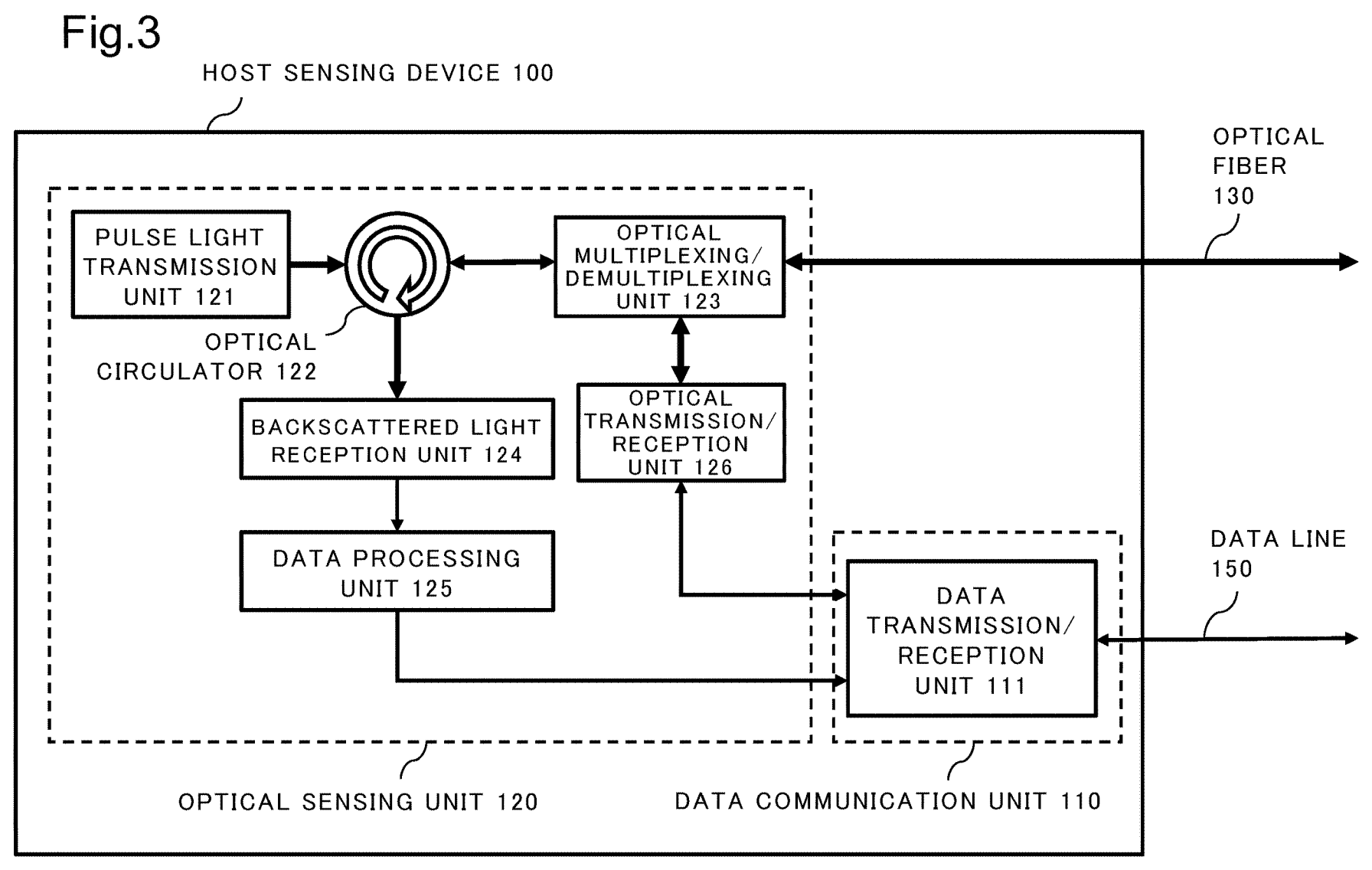

FIG. 3 is a block diagram illustrating a configuration example of the host sensing device 100 included in the host station 10. The host sensing device 100 includes the data communication unit 110 and the optical sensing unit 120 as functional blocks. The data communication unit 110 includes a data transmission/reception unit 111. The optical sensing unit 120 includes a pulse light transmission unit 121, an optical circulator 122, an optical multiplexing/demultiplexing unit 123, a backscattered light reception unit 124, a data processing unit 125, and an optical transmission/reception unit 126.

The optical multiplexing/demultiplexing unit 123 is an optical wavelength filter of three ports. The optical multiplexing/demultiplexing unit 123 causes light of a wavelength of pulse light and light of a wavelength of backscattered light to propagate between the optical fiber 130 and the optical circulator 122. Further, the optical multiplexing/demultiplexing unit 123 causes light of a wavelength of a signal being used for communication between the optical sensing unit 120 and the optical sensing unit 220 to propagate between the optical fiber 130 and the optical transmission/reception unit 126.

The host sensing device 100 transmits pulse light to the optical fiber 130, detects backscattered light generated inside the optical fiber 130, and thus performs sensing on a physical quantity in a position in the longitudinal direction of the optical fiber 130. The pulse light transmission unit 121 intermittently generates pulse light. The pulse light is transmitted to the optical fiber 130 through the optical circulator 122. Backscattered light generated in response to the pulse light is received by the backscattered light reception unit 124 through the optical circulator 122.

A function of the backscattered light reception unit 124 is similar to that of the backscattered light reception unit 224 included in the remote sensing device 200. In other words, the backscattered light reception unit 124 converts the backscattered light of the optical fiber 130 into an electric signal including information about a physical quantity to be a target of sensing. A kind of the backscattered light converted into the electric signal is selected according to a kind of the physical quantity (such as temperature, pressure, and vibration) to be the target of sensing. The backscattered light of the optical fiber 130 is converted into an electric signal for each detected wavelength range and output to the data processing unit 125.

The data processing unit 125 converts, into a digital signal, the backscattered light converted into the electric signal, and outputs the digital signal as sensing data about the optical fiber 130 to the data transmission/reception unit 111. The sensing data include data about a physical quantity needed for analyzing a sensing result of the optical fiber 130 in the analysis device 30 described below.

The optical transmission/reception unit 126 is an optical interface that converts the data signal light received from the optical fiber 130 into an electric signal, and outputs sensing data about the optical fiber 230 being extracted from the data signal light to the data transmission/reception unit 111. When the optical transmission/reception unit 126 receives an electric signal including data being output from the data transmission/reception unit 111 to the remote sensing device 200, the optical transmission/reception unit 126 may convert the electric signal into signal light. The signal light is transmitted to the remote sensing device 200 via the optical multiplexing/demultiplexing unit 123 and the optical fiber 130.

The data transmission/reception unit 111 is an interface that connects the data line 150 and the optical sensing unit 120. The data transmission/reception unit 111 outputs, to the data line 150, a signal including the sensing data about the optical fiber 130 being input from the data processing unit 125 and the sensing data about the optical fiber 230 being input from the optical transmission/reception unit 126. When the data transmission/reception unit 111 receives, from the data line 150, a signal transmitted from the analysis device 30, the data transmission/reception unit 111 may output the signal to the data processing unit 125 or the optical transmission/reception unit 126. The signal received by the host station 10 from the data line 150 may include, for example, control data for controlling at least one of the host sensing device 100 and the remote sensing device 200. When the received signal includes the control data for controlling the host sensing device 100, the data processing unit 125 controls the host sensing device 100 in response to the control data. Further, when the received signal includes the control data for controlling the remote sensing device 200, the optical transmission/reception unit 126 may output signal light for controlling the remote sensing device 200 to the optical fiber 130, based on the control data.

Figure 4:
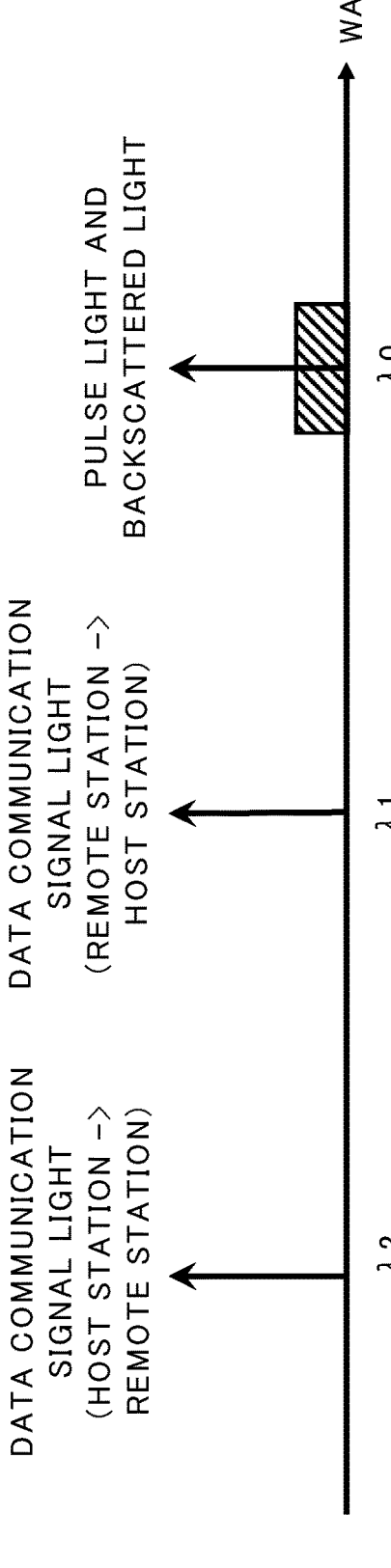
FIG. 4 is a diagram illustrating an example of a wavelength of light propagating through an optical fiber 130.

FIG. 4 is a diagram illustrating an example of a wavelength of light propagating through the optical fiber 130 in the optical fiber sensing system 1. In the optical fiber 130, pulse light (wavelength $\lambda 0$) generated by the pulse light transmission unit 121, backscattered light of the pulse light, and signal light (wavelengths $\lambda 1$ and $\lambda 2$) being used for data communication between the host station 10 and the remote station 20 propagate. A wavelength of the backscattered light is located near the wavelength $\lambda 0$ of the pulse light, and is thus indicated by oblique lines (hatching) in FIG. 4. The light of the wavelength $\lambda 1$ has a wavelength of light to be transmitted from the optical transmission/reception unit 211 of the remote sensing device 200 to the host sensing device 100. In other words, the light is data signal light including the sensing data about the optical fiber 230.

The light of the wavelength $\lambda 2$ has a wavelength of signal light to be transmitted from the optical transmission/reception unit 126 of the host sensing device 100 to the optical transmission/reception unit 211 of the remote sensing device 200. The signal light of the wavelength $\lambda 2$ in FIG. 4 is not necessary for transferring a sensing result of the optical fiber 230. The light of the wavelength can be used for transmitting a control signal from the host station 10 to the remote station 20 described above. The wavelength $\lambda 1$ and the wavelength $\lambda 2$ are different wavelengths, and a wavelength range of the wavelength $\lambda 0$ of the pulse light and the backscattered light does not overlap any of wavelength ranges of the signal light of the wavelength $\lambda 1$ and the signal light of the wavelength $\lambda 2$. Note that an arrangement of the wavelengths $\lambda 0$, $\lambda 1$, and $\lambda 2$ may be any arrangement.

A wavelength characteristic of the wavelength multiplexing/demultiplexing unit 123 of the host sensing device 100 is set in such a way that the light of the wavelength $\lambda 0$ and the backscattered light of the light of the wavelength $\lambda 0$ propagate at a low loss between the optical fiber 130 and the optical circulator 122. Further, a wavelength characteristic of the wavelength multiplexing/demultiplexing unit 123 is set in such a way that the light of the wavelength $\lambda 1$ and the light of the wavelength $\lambda 2$ propagate at a low loss between the optical fiber 130 and the optical transmission/reception unit 126. By including an optical filter that multiplexes and separates the wavelengths $\lambda 1$ and $\lambda 2$ inside the optical transmission/reception unit 126 and the optical transmission/reception unit 211, the optical transmission/reception unit 126 and the optical transmission/reception unit 211 can perform single-core bidirectional communication using the optical fiber 130 by a known technique. Alternatively, with $\lambda 1$ and $\lambda 2$ being set as the same, the optical transmission/reception unit 126 and the optical transmission/reception unit 211 may perform single-core bidirectional transmission by time division communication.

In this way, by setting a wavelength of pulse light and a wavelength used in data communication to be different from each other, the remote station 20 can transfer a sensing result of the optical fiber 230 to the host station 10 with only the optical fiber 130 as a transmission path. In other words, the remote station 20 can transfer a sensing result of the optical fiber 230 to the analysis device 30 without preparing, between the analysis device 30 and the remote station 20, a communication line that can directly perform communication, and preparing a data communication line different from the optical fiber 130. Furthermore, by performing single-core bidirectional communication by using the optical fiber 130, data transmission can be achieved from the host station 10 to the remote station 20, and, also in this case, a new transmission path other than the optical fiber 130 does not need to be prepared.

Figure 5:
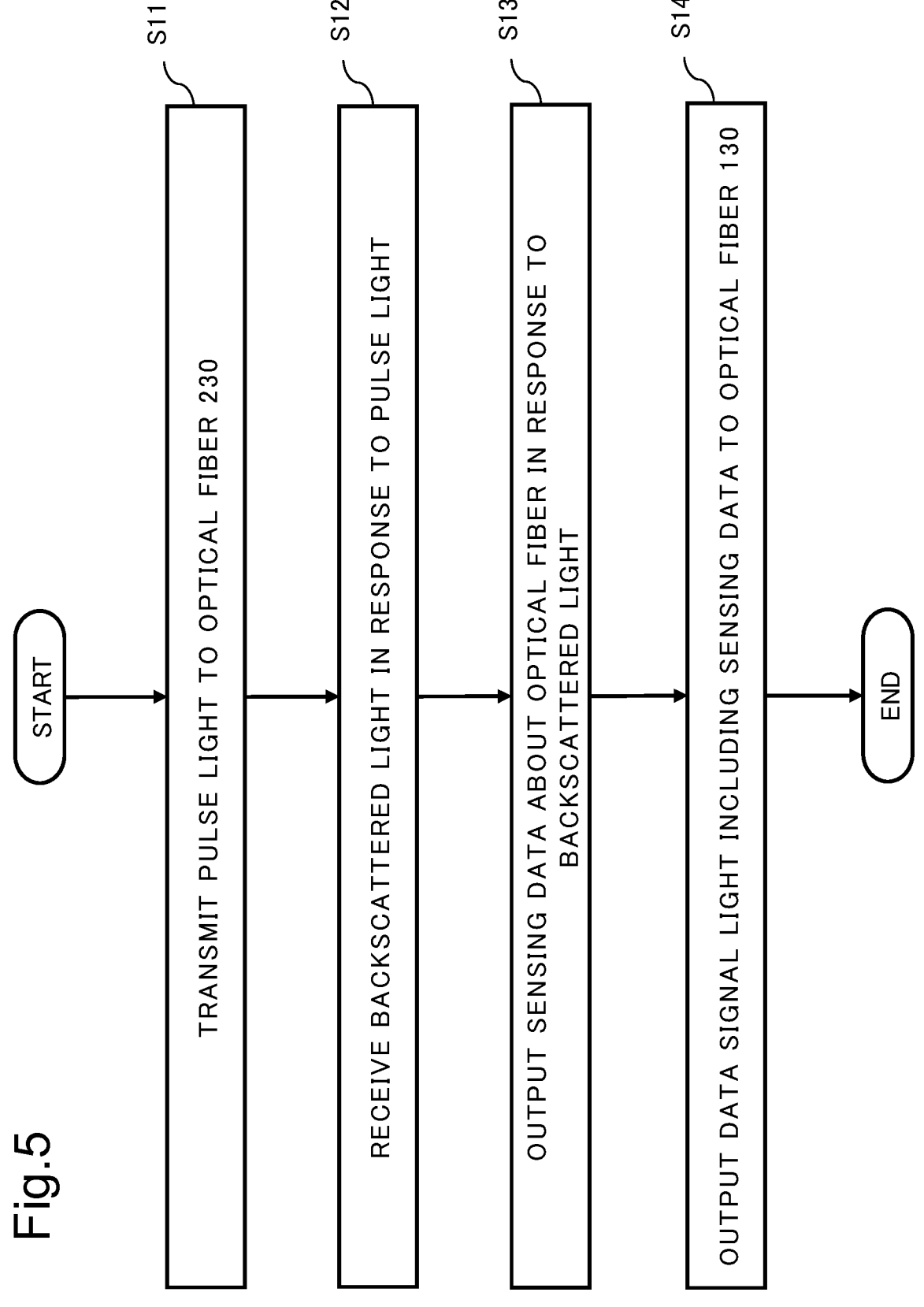
FIG. 5 is a flowchart illustrating an example of an operation procedure of the remote sensing device 200.

FIG. 5 is a flowchart illustrating an example of a basic operation procedure of the remote sensing device 200. The optical sensing unit 220 transmits pulse light to the optical fiber 230 (step S11 in FIG. 5), and receives backscattered light in response to the pulse light (step S12). The optical sensing unit 220 outputs data (sensing data) about a sensing result of the optical fiber 230 in response to the backscattered light (step S13). The data communication unit 210 outputs, to the optical fiber 130, data signal light including the sensing data being output from the optical sensing unit 220 (step S14). Herein, the optical fiber 130 is an optical fiber on which the host sensing device 100 performs sensing.

Figure 6:
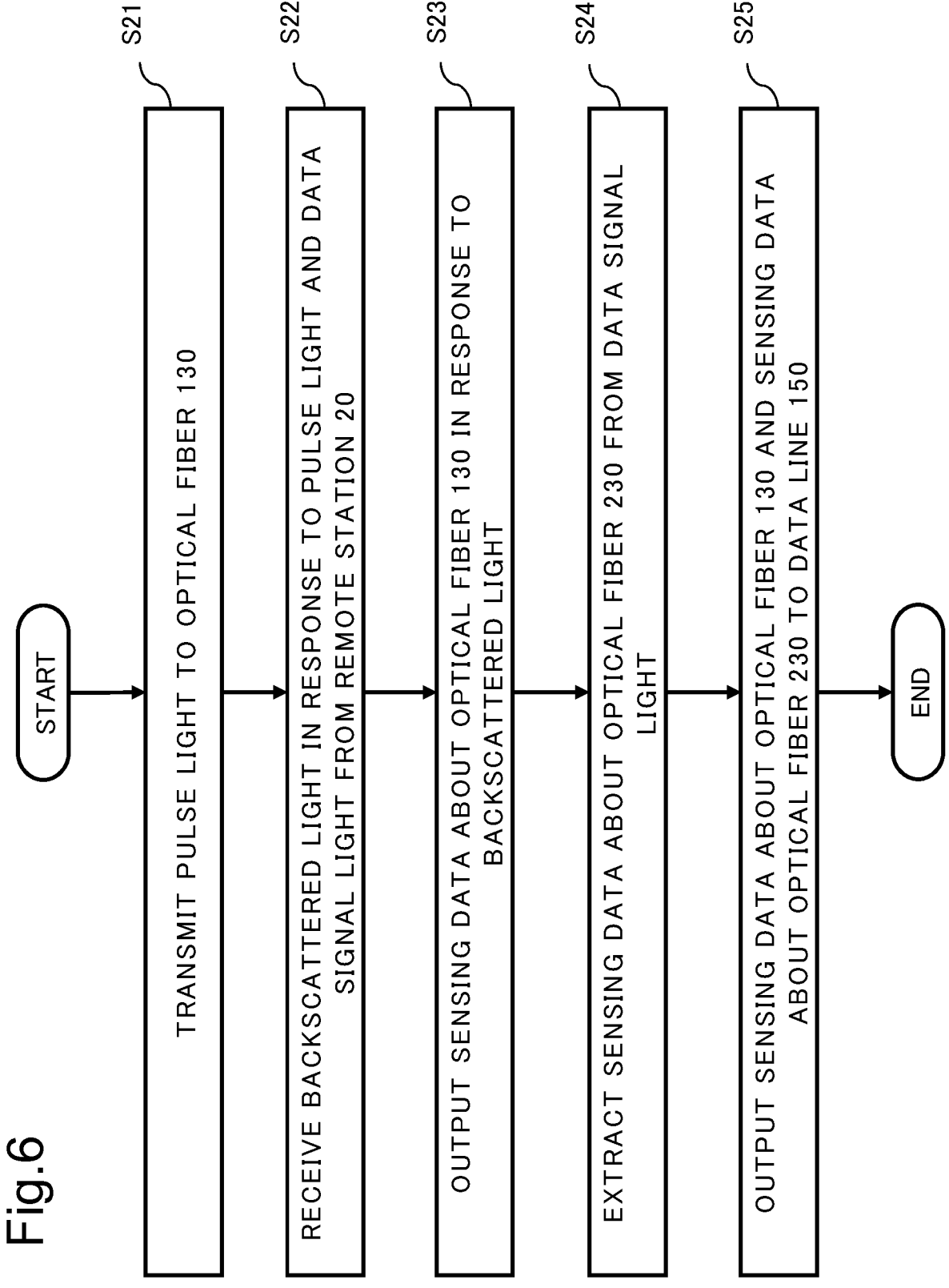
FIG. 6 is a flowchart illustrating an example of an operation procedure of the host remote sensing device 100.

FIG. 6 is a flowchart illustrating an example of a basic operation procedure of the host sensing device 100. The optical sensing unit 120 transmits pulse light to the optical fiber 130 (step S21 in FIG. 6). Then, the optical sensing unit 120 receives backscattered light in response to the pulse light and data signal light from the remote station 20 (step S22). The data processing unit 125 of the optical sensing unit 120 outputs sensing data about the optical fiber 130 in response to the backscattered light (step S23). Meanwhile, the optical transmission/reception unit 126 of the optical sensing unit 120 extracts sensing data about the optical fiber 230 from the data signal (step S24). Then, the data transmission/reception unit 111 of the data communication unit 110 receives the sensing data about the optical fiber 130 and the sensing data about the optical fiber 230 from the optical sensing unit 120, and outputs the sensing data to the data line 150 (step S25). The data line 150 is communicably connected to the analysis device 30.

The optical fiber sensing system 1 described above does not need to prepare, between the host station 10 and the remote station 20, a physical line for transferring sensing data about the optical fiber 230 to the analysis device 30. The reason is that the remote station 20 converts the sensing data about the optical fiber 230 into data signal light, and transfers the data signal light to the host station 10 via the optical fiber 130 on which the host station 10 performs sensing.

In other words, the optical fiber sensing system 1 achieves an effect that can easily construct an optical fiber sensing system.

Modification Example of First Example Embodiment

The effect of the first example embodiment can also be acquired by an optical fiber sensing system having a configuration below. A reference sign associated with FIG. 1 is denoted in parentheses of each element.

An optical sensing system includes a host sensing device (100) and a remote sensing device (200). The host sensing device (100) includes a first optical sensing means (120) and a first data communication means (110).

The first optical sensing means (120) receives, from a first optical fiber (130), first light in response to first pulse light being input to the first optical fiber (130), and first signal light. Then, the first optical sensing means (120) outputs first sensing data about the first optical fiber (130) in response to the first light, and second sensing data included in the first signal light.

The first data communication means (110) outputs a data signal including the first sensing data and the second sensing data.

The remote sensing device (200) includes a second optical sensing means (220) and a second data communication means (210).

The second optical sensing means (220) receives, from a second optical fiber (230), second light in response to second pulse light being input to the second optical fiber (230). Then, the second optical sensing means (220) outputs second sensing data including a sensing result of the second optical fiber in response to the second light.

Further, the second data communication means (210) outputs first signal light including the second sensing data to the first optical fiber (130).

The remote sensing device (200) converts the sensing data about the second optical fiber (230) into the first signal light, and transfers the first signal light to the host sensing device 100 via the first optical fiber (130). Then, the host sensing device (100) outputs a data signal including the first sensing data and the second sensing data. Therefore, a physical line for transferring the sensing data about the second optical fiber (230) to another device does not need to be prepared. In other words, the configuration according to the present modification example also achieves the effect that can easily construct an optical fiber sensing system.

Second Example Embodiment

Figure 7:
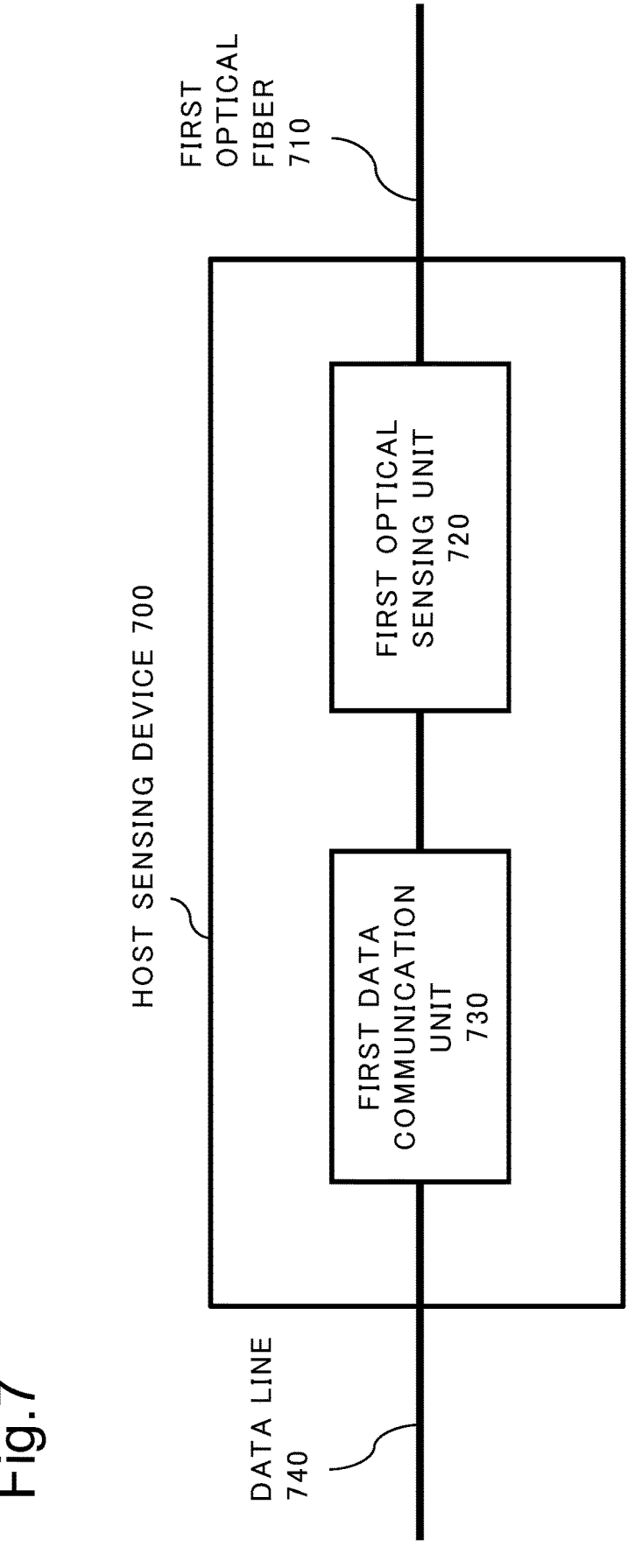
FIG. 7 is a block diagram illustrating a configuration example of a host sensing device 700 according to a second example embodiment.

FIG. 7 is a block diagram illustrating a configuration example of a host sensing device 700 according to a second example embodiment of the present invention. The host sensing device 700 is a device that performs sensing using a first optical fiber 710. The host sensing device 700 includes a first optical sensing unit 720 and a first data communication unit 730.

The first optical sensing unit 720 receives, from the first optical fiber, first light in response to first pulse light being input to the first optical fiber 710, and first signal light. Then, the first optical sensing unit 720 outputs first sensing data about the first optical fiber 710 in response to the first light, and second sensing data included in the first signal light.

The first data communication unit 730 outputs a data signal including the first sensing data and the second sensing data.

The host sensing device 700 having such a configuration can also output the second sensing data included in the first signal light being received from the first optical fiber 710 in addition to the first sensing data being sensing data about the first optical fiber 710. Therefore, the host sensing device 700 can output a data signal including the first sensing data and the second sensing data without preparing a transmission path for transmitting the first signal light. Therefore, the host sensing device 700 achieves the effect that can easily construct an optical fiber sensing system.

Third Example Embodiment

Figure 8:
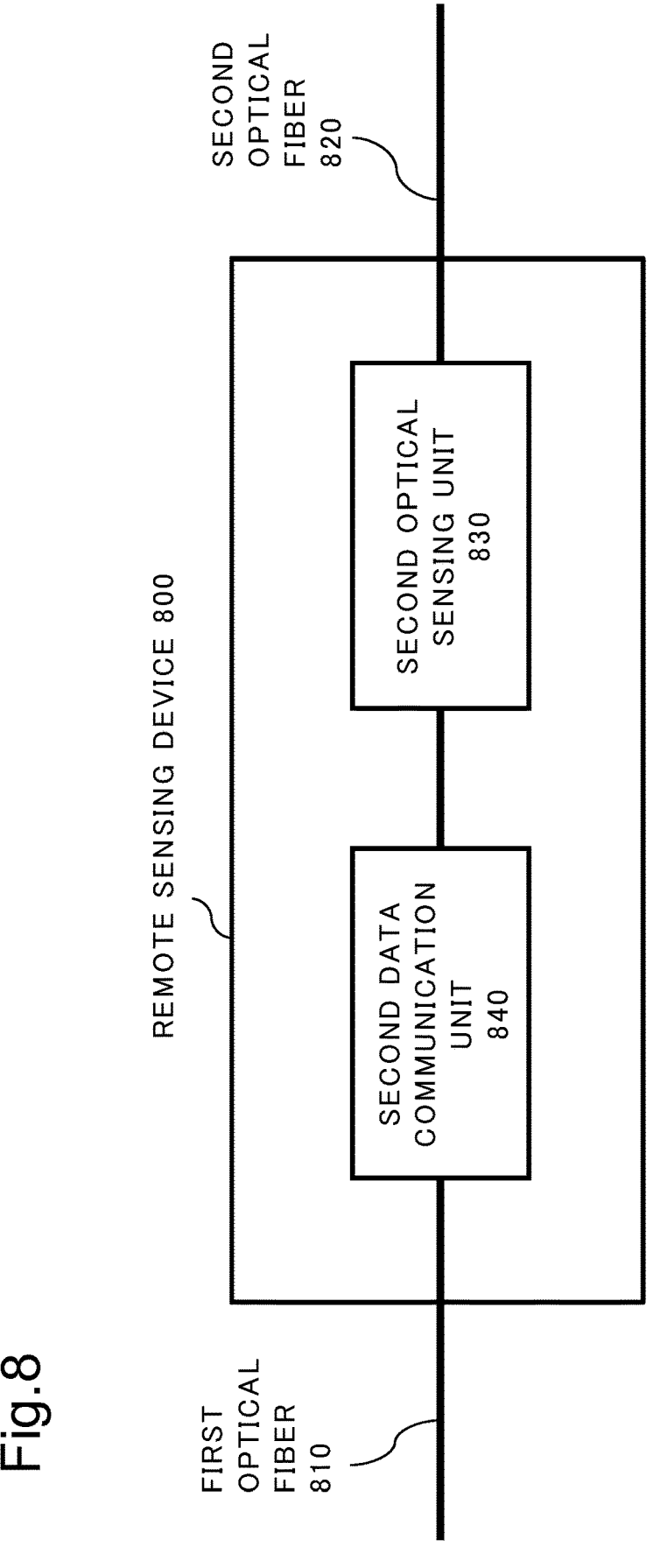
FIG. 8 is a block diagram illustrating a configuration example of a remote sensing device 800 according to a third example embodiment.
Figure 9:
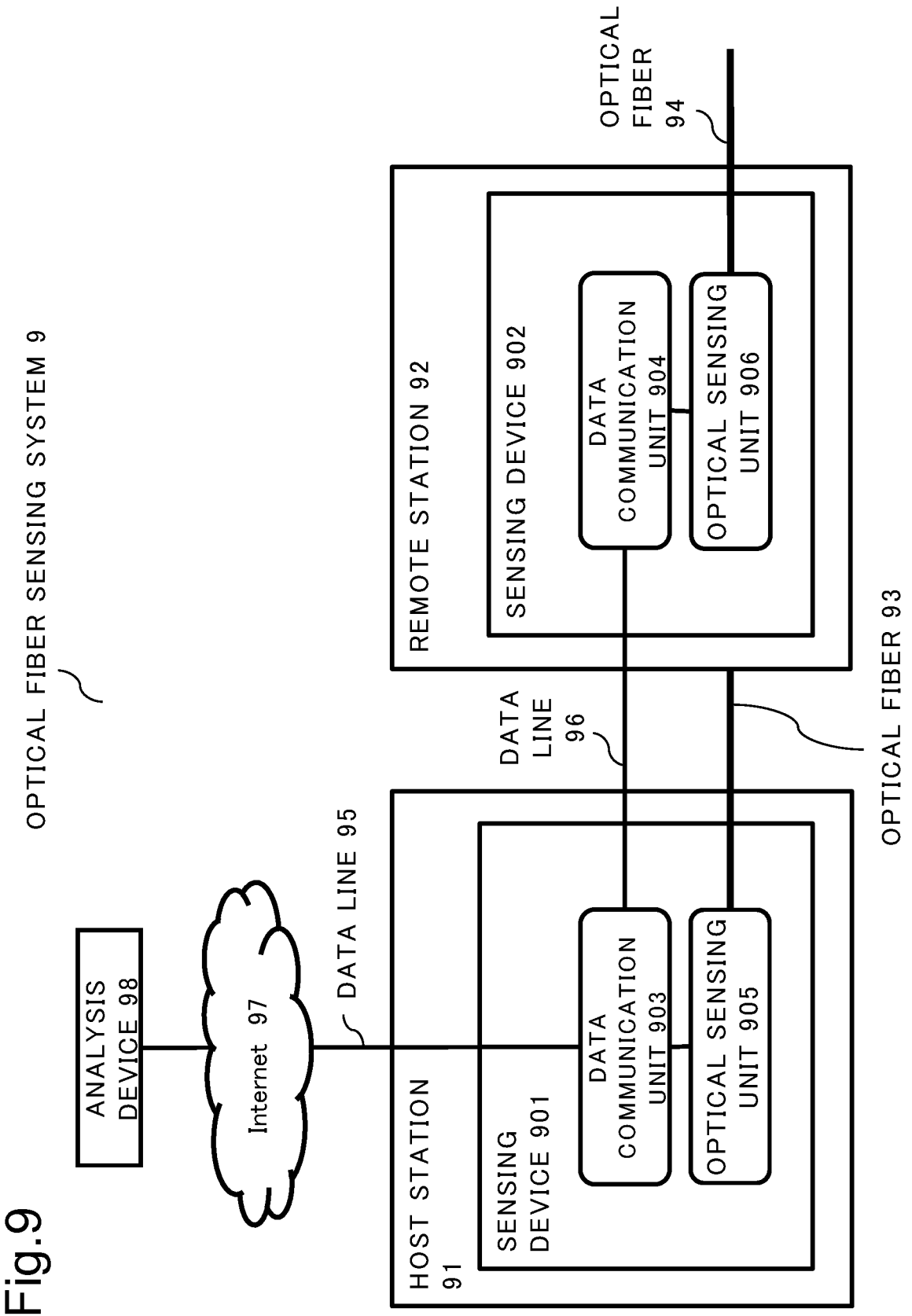
FIG. 9 is a diagram illustrating a configuration example of a general optical fiber sensing system 9.

FIG. 8 is a block diagram illustrating a configuration example of a remote sensing device 800 according to a third example embodiment of the present invention. The remote sensing device 800 is a device that performs sensing using a second optical fiber 820. The remote sensing device 800 includes a second optical sensing unit 830 and a second data communication unit 840.

The second optical sensing unit 830 receives, from the second optical fiber 820, second light in response to second pulse light being input to the second optical fiber 820, and outputs second sensing data including a sensing result of the second optical fiber in response to the second light.

The second data communication unit 840 outputs first signal light including the second sensing data to a first optical fiber 810.

The remote sensing device 800 having such a configuration outputs the sensing data about the second optical fiber 820 to the first optical fiber 810. Thus, even when the first optical fiber 810 is used for communication or sensing by another device, a physical line other than the first optical fiber 810 does not need to be newly constructed for transferring the sensing data about the second optical fiber 820. Therefore, the remote sensing device 800 achieves the effect that can easily construct an optical fiber sensing system.

Note that a part or the whole of the example embodiments described above can be described as, but not limited to, the following supplementary notes.

(Supplementary Note 1)

An optical fiber sensing system including:

a host sensing device including a first optical sensing means for receiving, from a first optical fiber, first light in response to first pulse light being input to the first optical fiber, and first signal light, and outputting first sensing data about the first optical fiber in response to the first light and second sensing data included in the first signal light, and a first data communication means for outputting a data signal including the first sensing data and the second sensing data; and a remote sensing device including a second optical sensing means for receiving, from a second optical fiber, second light in response to second pulse light being input to the second optical fiber, and outputting the second sensing data including a sensing result of the second optical fiber in response to the second light, and a second data communication means for outputting the first signal light including the second sensing data to the first optical fiber.

(Supplementary Note 2)

The optical fiber sensing system according to supplementary note 1, wherein the first optical sensing means includes a first pulse light transmission means for intermittently outputting the first pulse light, a first optical reception means for receiving the first light, a data processing means for outputting the first sensing data including a physical quantity in response to the first light, and an optical interface that outputs the second sensing data included in the first signal light.

(Supplementary Note 3)

The optical fiber sensing system according to supplementary note 2, wherein the first data communication means outputs, to the optical interface, data to be transmitted to the remote sensing device, and the optical interface outputs data signal light including the data to the first optical fiber.

(Supplementary Note 4)

The optical fiber sensing system according to supplementary note 3, wherein the second data communication means converts the data signal light being received from the first optical fiber into an electric signal, and outputs the electric signal to the second optical sensing means.

(Supplementary Note 5)

The optical fiber sensing system according to any one of supplementary notes 1 to 4, wherein the second optical sensing means includes a second pulse light transmission means for intermittently outputting the second pulse light, a second optical reception means for receiving the second light, and a second data processing means for outputting the second sensing data including a physical quantity in response to the second light.

(Supplementary Note 6)

The optical fiber sensing system according to any one of supplementary notes 1 to 5, wherein the first light and the second light are backscattered light of the first optical fiber in response to the first pulse light and backscattered light of the second optical fiber in response to the second pulse light, respectively.

(Supplementary Note 7)

The optical fiber sensing system according to any of supplementary notes 1 to 6, wherein wavelengths of the first pulse light, the first light, and the first signal light do not overlap one another.

(Supplementary Note 8)

The optical fiber sensing system according to any one of supplementary notes 1 to 7, further including an analysis device including a reception means for receiving the data signal from the host sensing device, and an analysis engine that outputs a sensing result of the first optical fiber and the second optical fiber, based on the first sensing data and the second sensing data that are included in the data signal.

(Supplementary Note 9)

A host sensing device including:

a first optical sensing means for receiving, from a first optical fiber, first light in response to first pulse light being input to the first optical fiber, and first signal light, and outputting first sensing data about the first optical fiber in response to the first light and second sensing data included in the first signal light; and a first data communication means for outputting a data signal including the first sensing data and the second sensing data.

(Supplementary Note 10)

The host sensing device according to supplementary note 9, wherein the first optical sensing means includes a first pulse light transmission means for intermittently outputting the first pulse light, a first optical reception means for receiving the first light, a data processing means for outputting the first sensing data including a physical quantity in response to the first light, and an optical interface that outputs the second sensing data included in the first signal light.

(Supplementary Note 11)

The host sensing device according to supplementary note 10, wherein the first data communication means outputs, to the optical interface, data to be transmitted to another device, and the optical interface outputs data signal light including the data to the first optical fiber.

(Supplementary Note 12)

A remote sensing device including:

a second optical sensing means for receiving, from a second optical fiber, second light in response to second pulse light being input to the second optical fiber, and outputting second sensing data including a sensing result of the second optical fiber in response to the second light; and a second data communication means for outputting first signal light including the second sensing data to a first optical fiber.

(Supplementary Note 13)

The remote sensing device according to supplementary note 12, wherein the second optical sensing means includes a second pulse light transmission means for intermittently outputting the second pulse light, a second optical reception means for receiving the second light, and a second data processing means for outputting the second sensing data including a physical quantity in response to the second light.

(Supplementary Note 14)

The remote sensing device according to supplementary note 13, wherein the second data communication means converts data signal light being received from the first optical fiber into an electric signal, and outputs the electric signal to the second optical sensing means.

(Supplementary Note 15)

A sensing method including:

receiving, from a first optical fiber, first light in response to first pulse light being input to the first optical fiber, and first signal light, and outputting first sensing data about the first optical fiber in response to the first light and second sensing data included in the first signal light;

outputting a data signal including the first sensing data and the second sensing data;

receiving, from a second optical fiber, second light in response to second pulse light being input to the second optical fiber, and outputting the second sensing data including a sensing result of the second optical fiber in response to the second light; and outputting the first signal light including the second sensing data to the first optical fiber.

(Supplementary Note 16)

A method for controlling a sensing device, including:

receiving, from a first optical fiber, first light in response to first pulse light being input to the first optical fiber, and first signal light, and outputting first sensing data about the first optical fiber in response to the first light and second sensing data included in the first signal light; and outputting a data signal including the first sensing data and the second sensing data.

(Supplementary Note 17)

A method for controlling a sensing device, including:

receiving, from a second optical fiber, second light in response to second pulse light being input to the second optical fiber, and outputting second sensing data including a sensing result of the second optical fiber in response to the second light; and outputting first signal light including the second sensing data to a first optical fiber.

(Supplementary Note 18)

A recording medium for a program causing a computer of a sensing device to execute:

a procedure of receiving, from a first optical fiber, first light in response to first pulse light being input to the first optical fiber, and first signal light, and outputting first sensing data about the first optical fiber in response to the first light and second sensing data included in the first signal light; and a procedure of outputting a data signal including the first sensing data and the second sensing data.

(Supplementary Note 19)

A recording medium for a program causing a computer of a sensing device to execute:

a procedure of receiving, from a second optical fiber, second light in response to second pulse light being input to the second optical fiber, and outputting second sensing data including a sensing result of the second optical fiber in response to the second light; and a procedure of outputting first signal light including the second sensing data to a first optical fiber.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the configuration described in each of the example embodiments is not necessarily exclusive. The action and effects of the present invention may be achieved by a configuration combining the whole or a part of the above-mentioned example embodiments.

The function and the procedure described in each of the example embodiments above may be achieved by a program executed by a central processing unit (CPU) included in the host sensing devices 100 and 700 or the remote sensing devices 200 and 800. The program is recorded in a non-temporary fixed recording medium. A semiconductor memory or a fixed magnetic disk device is used as the recording medium, which is not limited thereto. The CPU is a computer included in at least one of the data processing unit 125, the data processing unit 225, the first optical sensing unit 720, and the second optical sensing unit 830.

REFERENCE SIGNS LIST

1, 9 Optical fiber sensing system
10 Host station
20 Remote station
100 Host sensing device
200 Remote sensing device
110, 210 Data communication unit
111 Data transmission/reception unit
120, 220 Optical sensing unit
121, 221 Pulse light transmission unit
122, 222 Optical circulator
123 Optical multiplexing/demultiplexing unit
124, 224 Backscattered light reception unit
125, 225 Data processing unit
126 Optical transmission/reception unit
130, 230 Optical fiber
150 Data line
160 Internet
211 Optical transmission/reception unit
30 Analysis device
310 Data communication unit

15

320 Analysis engine
700 Host sensing device
710 First optical fiber
720 First optical sensing unit
730 First data communication unit
800 Remote sensing device
810 First optical fiber
820 Second optical fiber
830 Second optical sensing unit
840 Second data communication unit
91 Host station
92 Remote station
98 Analysis device
93, 94 Optical fiber
95, 96 Data line
97 Internet
901, 902 Sensing device
903, 904 Data communication unit
905, 906 Optical sensing unit

What is claimed is:

1. An optical fiber sensing system comprising:
a host sensing device including:
    a first optical sensing circuit configured to receive, from a first optical fiber, first light in response to first pulse light being input to the first optical fiber, and first signal light, and output first sensing data about the first optical fiber in response to the first light and second sensing data included in the first signal light; and
    a first data communication circuit configured to output a data signal including the first sensing data and the second sensing data; and
a remote sensing device including:
    a second optical sensing circuit configured to receive, from a second optical fiber, second light in response to second pulse light being input to the second optical fiber, and output the second sensing data including a sensing result of the second optical fiber in response to the second light; and
    a second data communication circuit configured to output the first signal light including the second sensing data to the first optical fiber.

2. The optical fiber sensing system according to claim 1, wherein the first optical sensing circuit includes:
a first pulse light transmission circuit configured to intermittently output the first pulse light;
a first optical reception circuit configured to receive the first light;
a data processing circuit configured to output the first sensing data including a physical quantity in response to the first light; and
an optical interface configured to output the second sensing data included in the first signal light.

3. The optical fiber sensing system according to claim 2, wherein the first data communication circuit is configured to output, to the optical interface, data to be transmitted to the remote sensing device, and
    wherein the optical interface is configured to output data signal light including the data to the first optical fiber.

4. The optical fiber sensing system according to claim 3, wherein the second data communication circuit converts the data signal light being received from the first optical fiber into an electric signal, and outputs the electric signal to the second optical sensing circuit.

5. The optical fiber sensing system according to claim 1, wherein the second optical sensing circuit includes:
a second pulse light transmission circuit configured to intermittently output the second pulse light;
a second optical reception circuit configured to receive the second light; and
a second data processing circuit configured to output the second sensing data including a physical quantity in response to the second light.

6. The optical fiber sensing system according to claim 1, wherein the first light and the second light are backscattered light of the first optical fiber in response to the first pulse light and backscattered light of the second optical fiber in response to the second pulse light, respectively.

7. The optical fiber sensing system according to claim 1, wherein wavelengths of the first pulse light, the first light, and the first signal light do not overlap one another.

8. The optical fiber sensing system according to claim 1, further comprising:
an analysis device including:
    a reception circuit configured to receive the data signal from the host sensing device; and
    an analysis engine configured to output a sensing result of the first optical fiber and the second optical fiber, based on the first sensing data and the second sensing data that are included in the data signal.

9. A host sensing device comprising:
a first optical sensing circuit configured to receive, from a first optical fiber, first light in response to first pulse light being input to the first optical fiber, and first signal light, and output first sensing data about the first optical fiber in response to the first light and second sensing data included in the first signal light; and
a first data communication circuit configured to output a data signal including the first sensing data and the second sensing data,
    wherein the first optical sensing circuit includes:
        a first pulse light transmission circuit configured to intermittently output the first pulse light;
        a first optical reception circuit configured to receive the first light;
        a data processing circuit configured to output the first sensing data including a physical quantity in response to the first light; and
        an optical interface configured to output the second sensing data included in the first signal light,
    wherein the first data communication circuit is configured to output, to the optical interface, data to be transmitted to another device; and
    wherein the optical interface is configured to output data signal light including the data to the first optical fiber.

10. A remote sensing device comprising:
a second optical sensing circuit configured to receive, from a second optical fiber, second light in response to second pulse light being input to the second optical fiber, and output second sensing data including a sensing result of the second optical fiber in response to the second light; and
a second data communication circuit configured to output first signal light including the second sensing data to a first optical fiber,
    wherein the second optical sensing circuit includes:
        a second pulse light transmission circuit configured to intermittently output the second pulse light;
        a second optical reception circuit configured to receive the second light; and a second data processing circuit configured to output the second sensing data including a physical quantity in response to the second light.

11. The remote sensing device according to claim 10, wherein the second data communication circuit is configured to convert data signal light being received from the first optical fiber into an electric signal, and outputs the electric signal to the second optical sensing circuit.

12. A sensing method comprising:

receiving, from a first optical fiber, first light in response to first pulse light being input to the first optical fiber, and first signal light, and outputting first sensing data about the first optical fiber in response to the first light and second sensing data included in the first signal light;

outputting a data signal including the first sensing data and the second sensing data;

receiving, from a second optical fiber, second light in response to second pulse light being input to the second optical fiber, and outputting the second sensing data including a sensing result of the second optical fiber in response to the second light; and outputting the first signal light including the second sensing data to the first optical fiber.

13. A method for controlling a sensing device, the method comprising:

receiving, from a first optical fiber, first light in response to first pulse light being input to the first optical fiber, and first signal light, and outputting first sensing data about the first optical fiber in response to the first light and second sensing data included in the first signal light;

outputting a data signal including the first sensing data and the second sensing data, wherein the sensing device includes:

a first pulse light transmission circuit configured to intermittently output the first pulse light;

a first optical reception circuit configured to receive the first light;

a data processing circuit configured to output the first sensing data including a physical quantity in response to the first light; and an optical interface configured to output the second sensing data included in the first signal light, wherein the method further comprises:

outputting, to the optical interface, data to be transmitted to another device; and outputting, by the optical interface, data signal light including the data to the first optical fiber.

14. A method for controlling a sensing device, the method comprising:

receiving, from a second optical fiber, second light in response to second pulse light being input to the second optical fiber, and outputting second sensing data including a sensing result of the second optical fiber in response to the second light; and outputting first signal light including the second sensing data to a first optical fiber, wherein the sensing device includes:

a second pulse light transmission circuit configured to intermittently output the second pulse light;

a second optical reception circuit configured to receive the second light; and a second data processing circuit configured to output the second sensing data including a physical quantity in response to the second light, and wherein the method further comprises converting data signal light being received from the first optical fiber into an electric signal, and outputting the electric signal to the second optical sensing circuit.

* * * * *